(12) United States Patent
Petitti (10) Patent No.: US 7,949,241 B2
(45) Date of Patent: May 24, 2011

(54) ANAMORPHIC FOCAL ARRAY

(75) Inventor: Frederick V. Petitti, Reston, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/569,030

(22) Filed: Sep. 29, 2009

(65) Prior Publication Data

US 2011/0076004 A1 Mar. 31, 2011

(51) Int. Cl.
*G03B 41/00* (2006.01)
(52) U.S. Cl. ............... 396/9; 396/334; 348/147
(58) Field of Classification Search .......... 396/7, 9, 396/332, 334, 340; 348/144, 145, 147
See application file for complete search history.

(56) References Cited

U.S. PATENT DOCUMENTS

| | | | |
|---|---|---|---|
| 2,995,993 A * | 8/1961 | Beatty | 396/10 |
| 3,560,642 A * | 2/1971 | Schroader et al. | 348/147 |
| 4,129,365 A | 12/1978 | Aversano et al. | |
| 4,630,111 A * | 12/1986 | Blain et al. | 348/147 |
| 4,678,321 A | 7/1987 | Inokuchi | |
| 4,825,232 A * | 4/1989 | Howdle | 396/12 |
| 4,872,747 A | 10/1989 | Jalkio et al. | |
| 5,237,167 A | 8/1993 | Hibbard | |
| 5,420,421 A | 5/1995 | Lindgren et al. | |
| 5,426,476 A * | 6/1995 | Fussell et al. | 396/12 |
| 5,491,346 A | 2/1996 | Sussmeier | |
| 5,953,162 A | 9/1999 | Blankenbecler | |
| 6,252,717 B1 | 6/2001 | Grosskopf | |
| 6,646,264 B1 | 11/2003 | Modiano et al. | |
| 6,719,429 B2 | 4/2004 | Peterson | |
| 6,728,488 B1 | 4/2004 | Peng et al. | |
| 6,747,686 B1 * | 6/2004 | Bennett | 348/145 |
| 6,871,817 B1 | 3/2005 | Knapp | |
| 6,969,856 B1 | 11/2005 | Hillenbrand et al. | |
| 6,995,920 B2 | 2/2006 | Nurishi | |
| 7,092,166 B1 | 8/2006 | Wood | |
| 7,289,272 B2 | 10/2007 | Bowron et al. | |
| 7,294,817 B2 | 11/2007 | Voigt et al. | |
| 7,349,062 B2 | 3/2008 | Neil et al. | |
| 7,446,925 B2 | 11/2008 | Bloom | |
| 7,732,744 B2 * | 6/2010 | Utagawa | 250/208.1 |
| 2007/0267584 A1 | 11/2007 | Cherry | |
| 2008/0192342 A1 | 8/2008 | Wood | |
| 2009/0059057 A1 | 3/2009 | Long et al. | |
| 2009/0212219 A1 | 8/2009 | Cook | |

* cited by examiner

*Primary Examiner* — Clayton E Laballe
*Assistant Examiner* — Leon W Rhodes
(74) *Attorney, Agent, or Firm* — Daly, Crowley, Mofford & Durkee, LLP (57) ABSTRACT

An imaging system includes an offset focal array including a plurality of photosensitive elements disposed at different focal lengths from at least one lens to output an image simulating an orthogonal view of an oblique coverage area. In further embodiments, the photosensitive elements are arranged in layers positioned substantially equal to the focal lengths of one or more focusing lenses.

26 Claims, 7 Drawing Sheets

ANAMORPHIC FOCAL ARRAY

BACKGROUND

As is known in the art, current sensor architectures for Wide Area Large Format (WALF) imaging and video systems consist of bundled arrays of fixed cameras. The military uses these arrays during surveillance missions and operations to capture and collect imagery of an area of interest. For example, the military may fix the bundled arrays to an airborne platform of an aircraft that orbits about and captures aerial imagery of the area of interest.

The bundled arrays can be compared to the eyes of bees consisting of compound lenses having the same focal length. The eyes of bees are quite useful for surveying fields at wide angles for food sources and for flight in swarms. In surveillance applications, bundled arrays are optimal for nadir imaging. However, hostile environments can limit or prevent surveillance aircraft from collecting overhead imagery. Many aircraft, therefore, collect imagery at oblique angles (i.e., not directly overhead) at safer distances from the coverage area.

As is also known in the art, imaging systems may use anamorphic projections to convert one-image format to another image format. Such anamorphic projections involve focusing object-light through a distorted lens or combination of lenses resulting in spatially modified image. The film industry may use anamorphic projectors with special lenses and hardware to change one cinematic format (such as widescreen format) to another cinematic format (such as 35 millimeter film).

SUMMARY

Spiders have compound eyes including lenses of several different focal lengths. This natural eye-model may contribute to a spider's ability to construct geometrically precise webs and monitor and pounce on their prey from oblique vantage points (e.g. hidden from their prey on one side of the web). The inventor realized that bundled arrays and other imaging systems could be optimized for oblique collections by mimicking the nature eye-model of a spider.

In general overview, the inventive systems, techniques, and concepts described herein are directed to imaging systems and methods that provide orthogonal views of oblique coverage areas. The orthogonal views are characterized by a more uniform resolution that can simplify image processing into range-invariant orthogonal projections. Such projections may include geospatial map projection formats such as the widely used World Geodetic System (WGS) 84 projection format.

In one aspect, an imaging system includes a focal array including a plurality of photosensitive elements disposed at different focal lengths from at least one lens to output an image simulating an orthogonal view of an oblique coverage area. The plurality of photosensitive elements may include at least one first photosensitive element arranged in a first layer and positioned at a distance from a first lens substantially equal to the focal length of the first lens, and at least one second photosensitive element arranged in a second layer and positioned at a distance from a second lens substantially equal to the focal length of the second lens, wherein the focal length of the first lens is longer than the focal length of the second lens.

In further embodiments, the imaging system includes one or more of the following features: the plane of the first layer is substantially parallel to the plane of the second layer, a light-absorbing face coupled at one side to the first layer and at another side laterally opposing the one side to the second layer; the plane of the light-absorbing face is orthogonal to at least one of the plane of the first layer and the plane of the second layer; the focal array is configured to rotate with respect to the oblique coverage area; the focal array is configured to substantially align a field-of-view of the focal array with the geographic center of the oblique coverage area; the focal array is configured to substantially align a field-of-view of the focal array with an object of interest situated within the oblique coverage area; the focal array is an anamorphic focal array, further including a processor to range-normalize a resolution of a plurality of image regions representing at least a portion of the oblique coverage area; at least one of the photosensitive elements is a charge-coupled device; the simulated orthogonal view represents a rectangular projection of the oblique coverage area and the image includes a plurality of resolution-normalized image regions; the focal array is configured to image the oblique coverage area from a surveillance area laterally opposed to the oblique coverage area; a first rotating member coupled to the focal array and configured to rotate the focal array about a first axis of rotation substantially parallel to the plane of the ground to modify an angle of obliqueness of the focal array with respect to the oblique coverage area, and; a second rotating member coupled to the focal array and configured to rotate a light conducting body independently from the focal array about a second axis of rotation orthogonal to the first axis of rotation to conduct light toward the focal array.

In another aspect, a method includes providing a focal array including a plurality of photosensitive elements disposed at different focal lengths from at least one lens to output an image simulating an orthogonal view of an oblique coverage area. The plurality of photosensitive elements may include at least one first photosensitive element arranged in a first layer and positioned at a distance from a first lens substantially equal to the focal length of the first lens, and at least one second photosensitive element arranged in a second layer and positioned at a distance from a second lens substantially equal to the focal length of the second lens, wherein the focal length of the first lens is longer than the focal length of the second lens.

In further embodiments, the method includes one or more of the following features: the plane of the first layer is substantially parallel to the plane of the second layer, the focal array further includes a light-absorbing face coupled at one side to the first layer and at another side laterally opposing the one side to the second layer; the plane of the light-absorbing face is orthogonal to at least one of the plane of the first layer and the plane of the second layer; the focal array is configured to rotate with respect to the oblique coverage area; aligning a field-of-view of the focal array with the geographic center of the oblique coverage area; aligning a field-of-view of the focal array with an object of interest situated within the oblique coverage area; processing the image to range-normalize a resolution of a plurality of image regions representing at least a portion of the oblique coverage area; at least one of the photosensitive elements is a charge-coupled device; the simulated orthogonal view represents a rectangular projection of the oblique coverage area and the image includes a plurality of resolution-normalized image regions; imaging the oblique coverage area from a surveillance area laterally opposed to the oblique coverage area; imaging the oblique coverage area from a plurality of vantage points situated within the laterally opposed surveillance area; providing a first rotating member coupled to the focal array and configured to rotate the focal array about a first axis of rotation substantially parallel to the plane of the ground to modify an angle of obliqueness of the focal array with respect to the oblique coverage area, and; a second rotating member coupled to the focal array and configured to rotate a light conducting body independently from the focal array about a second axis of rotation orthogonal to the first axis of rotation to conduct light toward the focal array.

BRIEF DESCRIPTION OF THE DRAWINGS

The foregoing features of this invention, as well as the invention itself, may be more fully understood from the following description of the drawings in which.

DETAILED DESCRIPTION

Figure 1A:
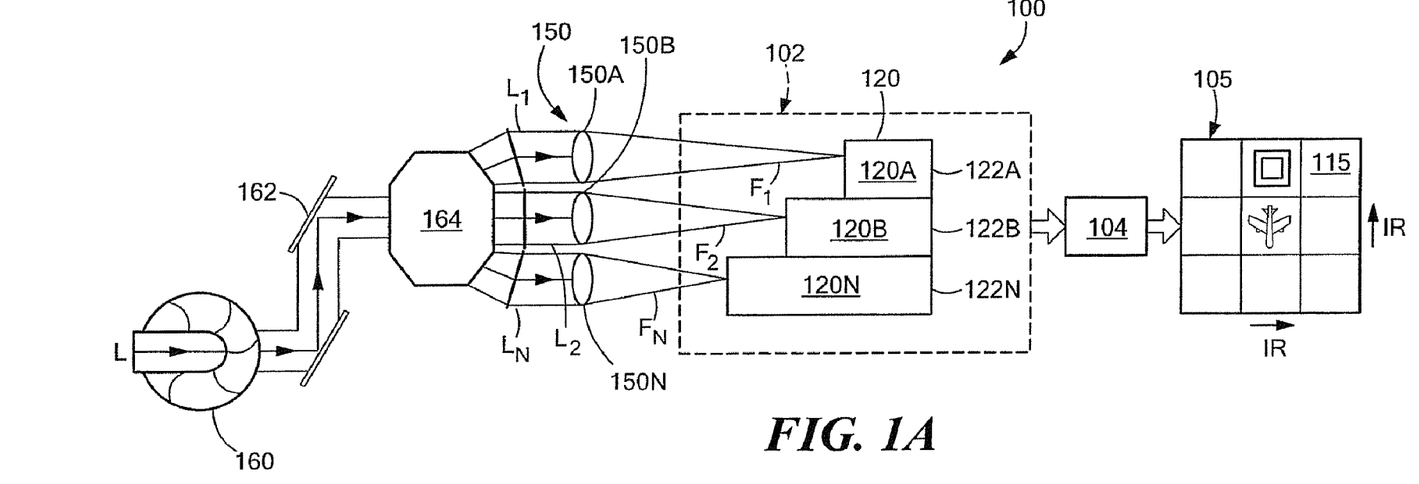
FIG. 1A is a pictorial representation of an embodiment of an imaging system including a focal array.
Figure 1B:
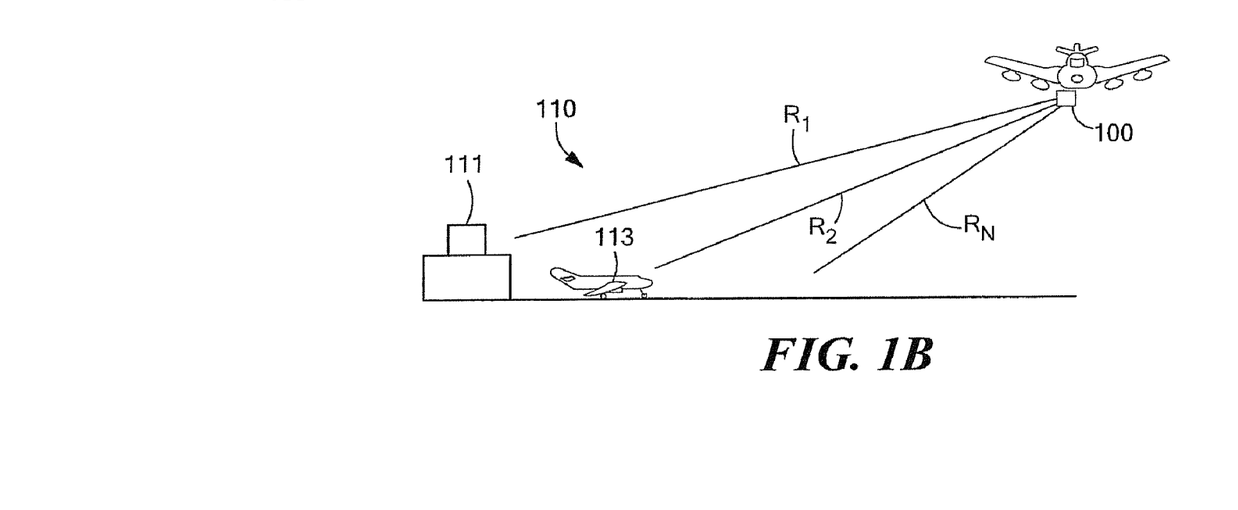
FIG. 1B is a pictorial representation of an exemplary environment incorporating the imaging system embodiment of FIG. 1A.

Referring to FIGS. 1A and 1B, an imaging system 100 includes a focal array 102 configured to capture an image 105 representing a coverage area 110 which may include one or more objects of interest (an example of which is denoted by reference numeral 111). The focal array 102 includes photosensitive elements 120A, 120B-120N (denoted generally by reference numeral 120) offset from each other and positioned to capture light L received from the imaged coverage area 110. For clarity in the description and the drawings, a first photosensitive element 120A, a second photosensitive elements 120B, and an Nth photosensitive element 120N are shown in FIG. 1A. It should be appreciated by one of ordinary skill that two, three, four, five, or any number (N) of photosensitive elements 120 may be used depending on the needs and/or desires of a particular application that may incorporate the inventive systems, techniques, and concepts described herein.

The photosensitive elements 120 may include, but are not limited to, a charge-coupled device (CCD) which is an analog shift register that can generate analog signals (widely used in light sensors, such those used in digital cameras), a complementary metal-oxide-semiconductor (CMOS) chip used in an active-pixel sensor (widely used for small cameras), other types of light sensors, or a combination thereof. The photosensitive elements 120 may receive light L from a variety of external optics including, but not limited to, focal lenses denoted generally by reference numeral 150 positioned to focus light on the photosensitive elements 120.

As by way of a non-limiting example, a first photosensitive element 120A, which may include a charge-coupled device (CCD), is positioned a distance from a first lens 150A that is substantially equal to the focal length $f_1$ of the first lens 150A, and a second photosensitive element 120B, which may also include a charge-coupled device (CCD), is positioned a distance from a second lens 150B that is substantially equal to the focal length $f_2$ of the second lens 150B. As described herein, the focal array 102 may include any number of photosensitive elements 120, as denoted in FIG. 1A by the Nth photosensitive element 120N, which is shown positioned a distance from Nth lens 150N that is substantially equal to the focal length $f_n$ of the Nth lens 150N.

In a further embodiment, the first photosensitive element 120A includes a plurality of photosensitive elements arranged in a first layer 122A, and the second photosensitive element 120B includes a plurality of photosensitive elements arranged in a second layer 122B. As can be seen in FIG. 1A, the focal length of the first lens 150A is longer than the focal length of the second lens 150B and the first and second layers 122A, 122B can be said to be offset from each other.

In operation, the offset photosensitive elements 120 can capture light L from different viewing ranges $R_1, R_2, R_N$ with respect to the coverage area 110. In applications in which the imaged coverage area 110 is obliquely situated with respect to the focal array 102, an anamorphic projection can be provided that simulates an orthogonal view 105 of the oblique coverage area 110. For example, light received from a first object 111 at a first viewing range $R_1$ tends to be focused on a first photosensitive element 120A and light received from a second object 113 at a second viewing range $R_2$ tends to be focused on a second photosensitive element 120B. In combination, the first and second photosensitive elements 120A, 120B (as well as Nth photosensitive element 120N) tend to bring into focus the variously positioned objects (i.e., objects 111, 113, etc.) situated in the imaged area 110. This results in an image 105 that is range-invariant and generally produces an orthogonal view.

Advantageously, the offset focal array 102 can generate an anamorphic projection without the need for distorted or specially formed lenses and/or expensive, time-consuming image processing to correct the image. The imaging system 100, therefore, can be used in applications that require or would benefit from real-time imaging.

Although described with reference to an oblique coverage area, it will be understood by one of ordinary skill in the art that the focal array 102 may be used when positioned at a nadir view (i.e., directly above) with respect to a coverage area. The focal array 102 may be particularly useful for capturing an imaged area that varies significantly in altitude, such as one including hills and valleys and/or urban city centers.

In some embodiments, other imaging components may be used such as a light aperture 160 to increase and/or decrease an amount of light directed to the focal array 102, adjustable mirrors 162, a beam splitter 164 to bend the light toward the photosensitive elements 120, and one or more lenses 150 configured to focus light received from different viewing ranges from the focal array 102. With this arrangement, the CCD elements 120A, 120B, 120N tend to receive focused light $L_1, L_2, L_N$ from the respective lens 150A, 150B, 150N at respective viewing ranges $R_1, R_2, R_N$ from the focal array 102. It will be understood by one of ordinary skill in the art that other methods and/or elements may be used to capture and focus the light. For example, the CCD elements 120 may capture and process a raw image without the need for outside optics, such as the above-described lenses 150, and/or using other kinds of external optics.

Referring again to FIGS. 1A and 1B, in a further embodiment the imaging system 100 includes a processor 104 to range-normalize an image resolution IR of a plurality of image regions (denoted generally by reference numeral 115) of image 105. The image regions 115 represent at least a portion of the oblique coverage area 110. A variety of methods known in the art may be used to range-normalize the image regions 115 based on the magnitude of the image resolutions.

Figure 2:
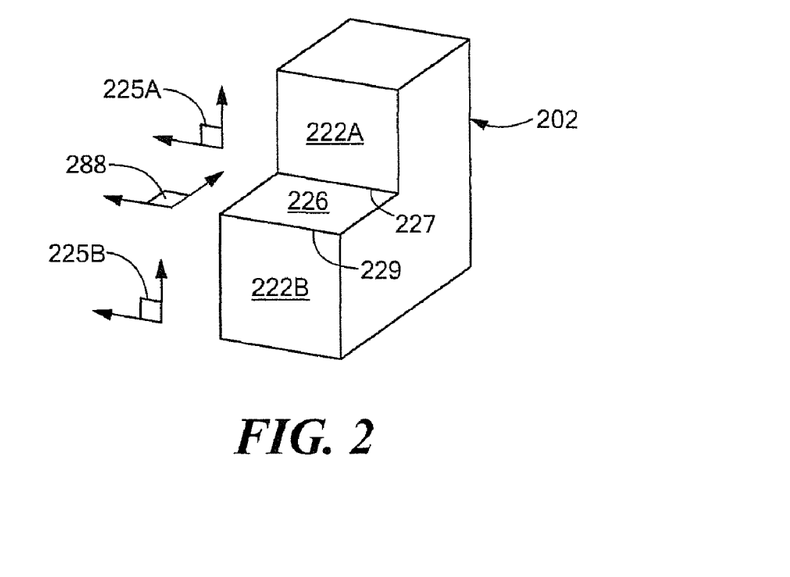
FIG. 2 is an embodiment of an offset focal array arrangement.

Referring now to FIG. 2, in still a further embodiment of a focal array 202, a plane 225A of a first layer of photosensitive elements 222A is substantially parallel to a plane 225B of a second layer of photosensitive elements 222B. In some embodiments, the first layer plane 225A and the second layer plane 225B may be positioned to optimally receive light, for example, light from focusing lenses. In such embodiments, for example, the first layer plane 225A and the second layer plane 225B may be orthogonal to a direction of received light.

The focal array 202 includes a light-absorbing face 226 coupled at one side 227 to the first layer 222A and at another side 229 opposing the one side 227 to the second layer 222B. In yet another embodiment, a plane 228 of the light-absorbing face 226 is orthogonal to at least one of the plane 225A of the first layer 222A and the plane 225B of the second layer 222B.

Figure 3:
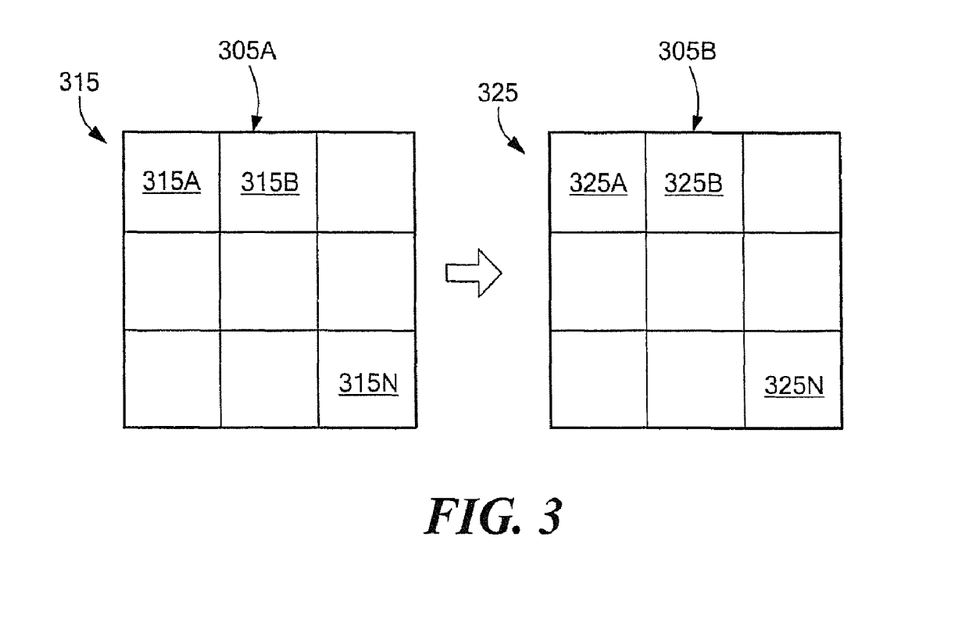
FIG. 3 is a pictorial representation an unprocessed image and a range-normalized version of the image.

Referring now to FIG. 3, an unprocessed image 305A includes regions 315. Each region includes a portion of the overall image 305A and may be characterized by an image resolution that can be the same or different from that of other regions of the unprocessed image 305A. For example, the unprocessed image 305A may include regions 315A, 315B, -315N characterized by respective image resolutions $IR_1$, $IR_2$, -$IR_N$. A first image resolution $IR_1$ of the first region 315A may equal 3 meters/pixel and a second image resolution $IR_2$ of second region 315B may equal 2 meters/pixel. In embodiments in which the photosensitive elements are CCD elements, the variant image resolutions are due to various physical factors, such as CCD pixel size, the number of individual CCD pixel elements, and the area captured by each pixel.

A range-normalized image 305B includes regions 325 characterized by processed image resolutions. For example, the image 305B may be normalized from two, three, four, five, up to N region image resolutions to fewer resolutions, such as one image resolution. As by way of a non-limiting example, the image 305B may include image regions 325A, 325, -325N normalized to an image resolution equal to 2 meters/pixel. It will be understood by one of ordinary skill in the art that not all of the regions 325 have to be normalized to a single value, but instead could be normalized based on the structure of the focal array. It may be useful, for example, to normalize the regions by focal array layer, such as the first and second focal array layers 122A, 122B described in conjunction with FIG. 1A.

Figure 4A:
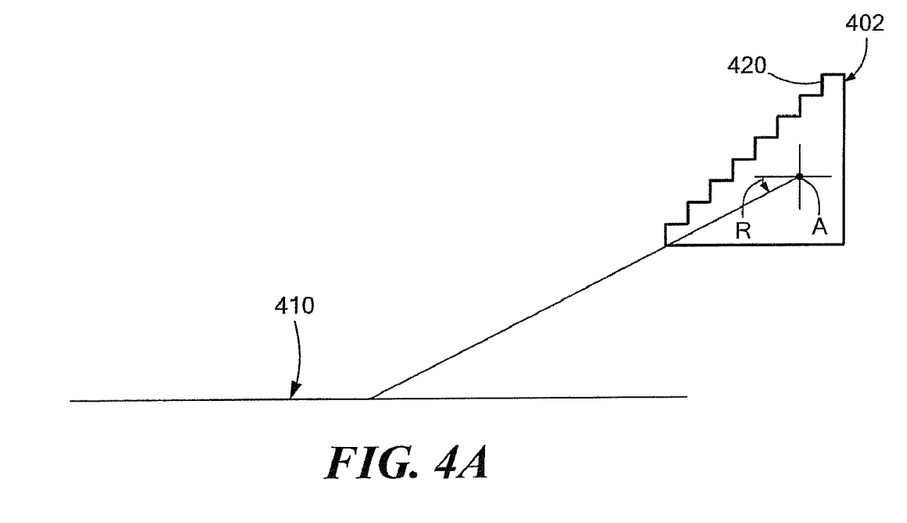
FIGS. 4A, 4B, and 4C are pictorial representations of embodiments of an offset focal array rotated with respect to an oblique coverage area.
Figure 4B:
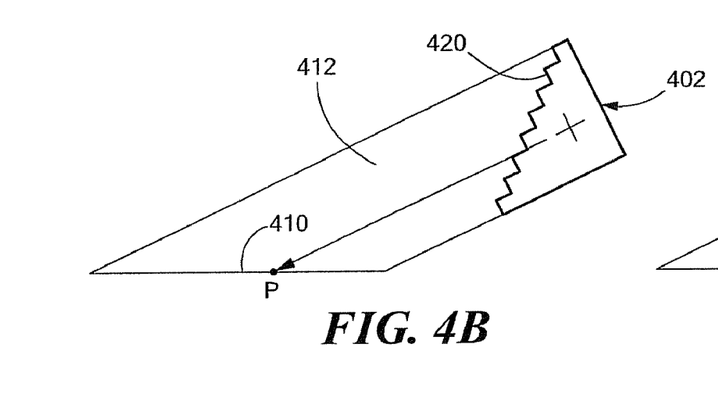
Figure 4C:
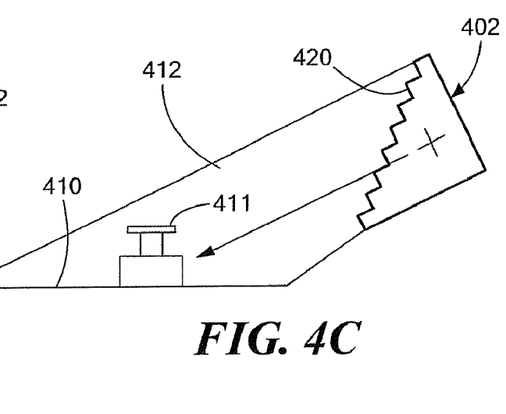

Referring now to FIGS. 4A, 4B, and 4C in which like elements are denoted by like reference numerals, in further embodiments the focal array 402 (shown in side view) is configured to rotate angle R with respect to the oblique coverage area 410 about an axis A. In a further embodiment, the focal array 402 is configured to rotate to substantially align the field-of-view 412 of the focal array 402 to a geographic center point P of the oblique coverage area 410.

In the same or different embodiment, the focal array 402 is configured to substantially align the field-of-view 412 of the focal array 402 with an area of interest. As by way of a non-limiting example, the area of interest may be an enemy training camp and/or a building 411 in which a meeting of enemy agents is expected to occur.

In operation, it can be seen in FIGS. 4A, 4B, and 4C that rotating the focal array 402 aligns the photosensitive elements 420 with the coverage area 410. Without such alignment, individual photosensitive elements 420 may interfere with each other by at least partially occluding each other with respect to the capture area 410.

Figure 5:
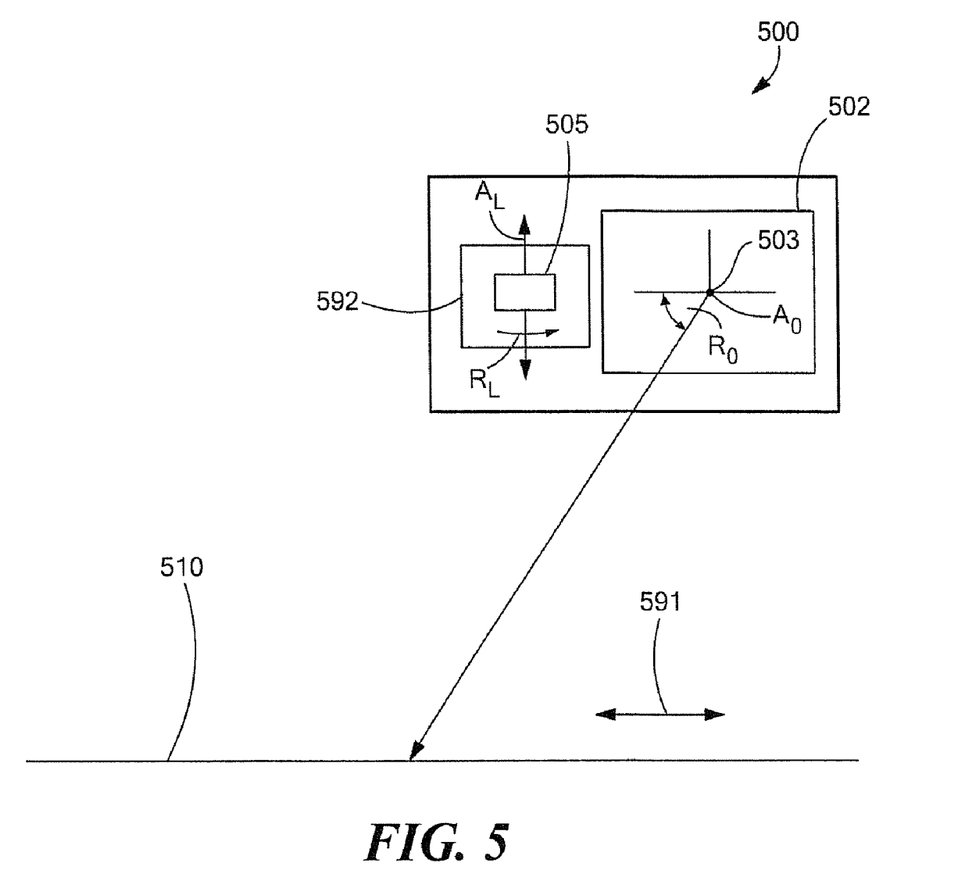
FIG. 5 is a pictorial representation of rotating member embodiments to rotate an imaging system relative to a coverage area.

Referring now to FIG. 5, in still a further embodiment, an imaging system 500 includes a first rotating member 503 coupled to the focal array 502 and configured to rotate the focal array 502 about a first axis of rotation $A_O$ substantially parallel to the plane of the ground 591 to modify an angle of obliqueness $R_O$ of the focal array 502 with respect to the oblique coverage area 510.

In the same or different embodiment, the imaging system 500 includes a second rotating member 505 coupled to the focal array 502 and configured to rotate a light conducting body 592 independently from the focal array 502 about a second axis of rotation $A_L$ orthogonal to the first axis of rotation $A_O$ to conduct light toward the focal array 502.

Figure 6:
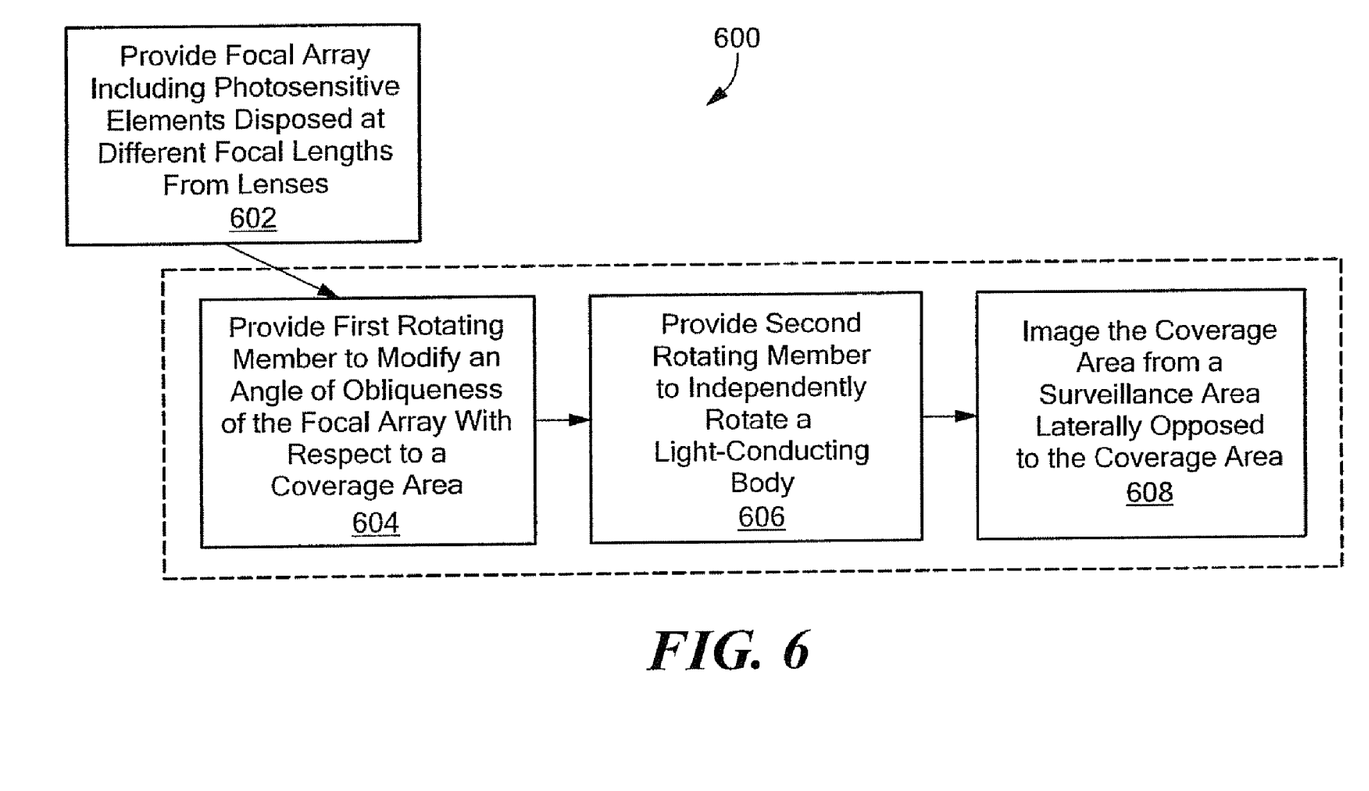
FIG. 6 is a flow diagram of an embodiment of an imaging method.

Referring now to FIG. 6, a method 600 includes providing an imaging system 602 including a focal array. The focal array includes photosensitive elements disposed at different focal lengths from lenses. In a further embodiment, the method 600 includes outputting an image simulating an orthogonal view of an obliquely situated coverage area.

In still a further embodiment, the method 600 includes providing a first photosensitive element arranged in a first layer and positioned at a distance from a first lens substantially equal to the focal length of the first lens, and providing a second photosensitive element arranged in a second layer and positioned at a distance from a second lens substantially equal to the focal length of the second lens. The focal length of the first lens is longer than the focal length of the second lens.

In another embodiment, the method 600 includes processing the image to range-normalize a resolution of a plurality of image regions representing at least a portion of the oblique coverage area.

Referring again to FIG. 6, in a further embodiment the method 600 includes providing a first rotating member 604 coupled to the focal array and configured to rotate the focal array about a first axis of rotation substantially parallel to the plane of the ground to modify an angle of obliqueness of the focal array with respect to an oblique coverage area. In still a further embodiment, the method 600 includes providing a second rotating member 606 coupled to the focal array and configured to rotate a light conducting body independently from the focal array about a second axis of rotation orthogonal to the first axis of rotation to conduct light toward the focal array.

In the same or different embodiment, the method 600 includes imaging the oblique coverage area 608 from a surveillance area laterally opposed to the oblique coverage area. In a further embodiment, the oblique coverage area is imaged from the surveillance area along a first direction and a second direction substantially opposite to the first direction.

Figure 7:
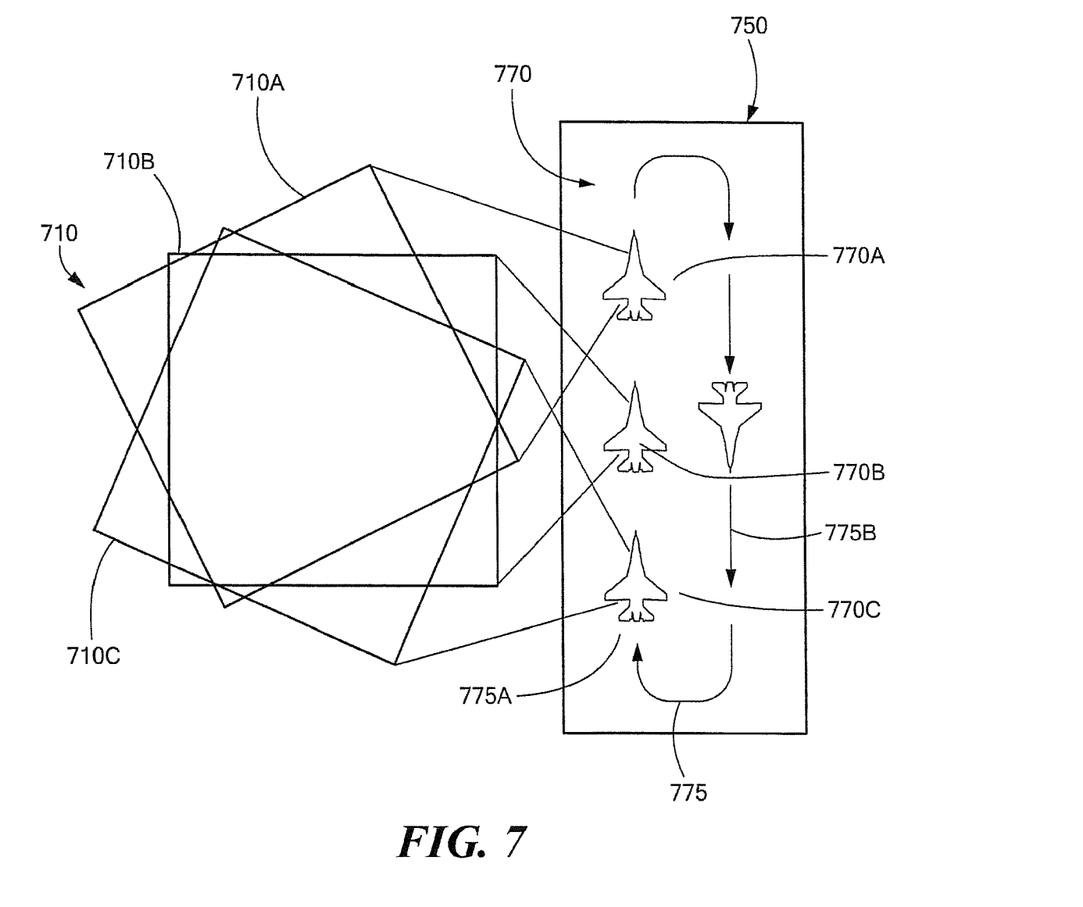
FIG. 7 is a pictorial representation of an imaging method in which a coverage area is surveyed from an area laterally opposed to the coverage area.

Referring now to FIG. 7, an exemplary embodiment of a method, as may be similar to method 600 described in conjunction with FIG. 6, includes imaging an oblique coverage area (generally denoted by reference numeral 710) from a plurality of vantage points (generally denoted by reference numeral 770) situated in a surveillance area 750 laterally opposed to the oblique coverage area 710. More particularly, an imaging system, as may be similar to imaging system 100 described in conjunction with FIGS. 1A and 1B, mounted to an aircraft may obtain oblique collections 710A, 710B, 710C from respective vantage points 770A, 770B, 770C along a flight path 775 traveled within the laterally opposed surveillance area 750. As can be seen in FIG. 7, the aircraft may obtain the oblique collections 710A, 710B, 710C while traveling in a first direction 775A along the path and may obtain one or more other collections while traveling in a second direction 775B along the path. In a further embodiment, the first and second directions 775A, 775B may be opposite to each other.

Advantageously, the imagery may be collected from safer vantage points in comparison to nadir vantage points which may be within visual site and/or firing range of hostile forces.

Figure 8:
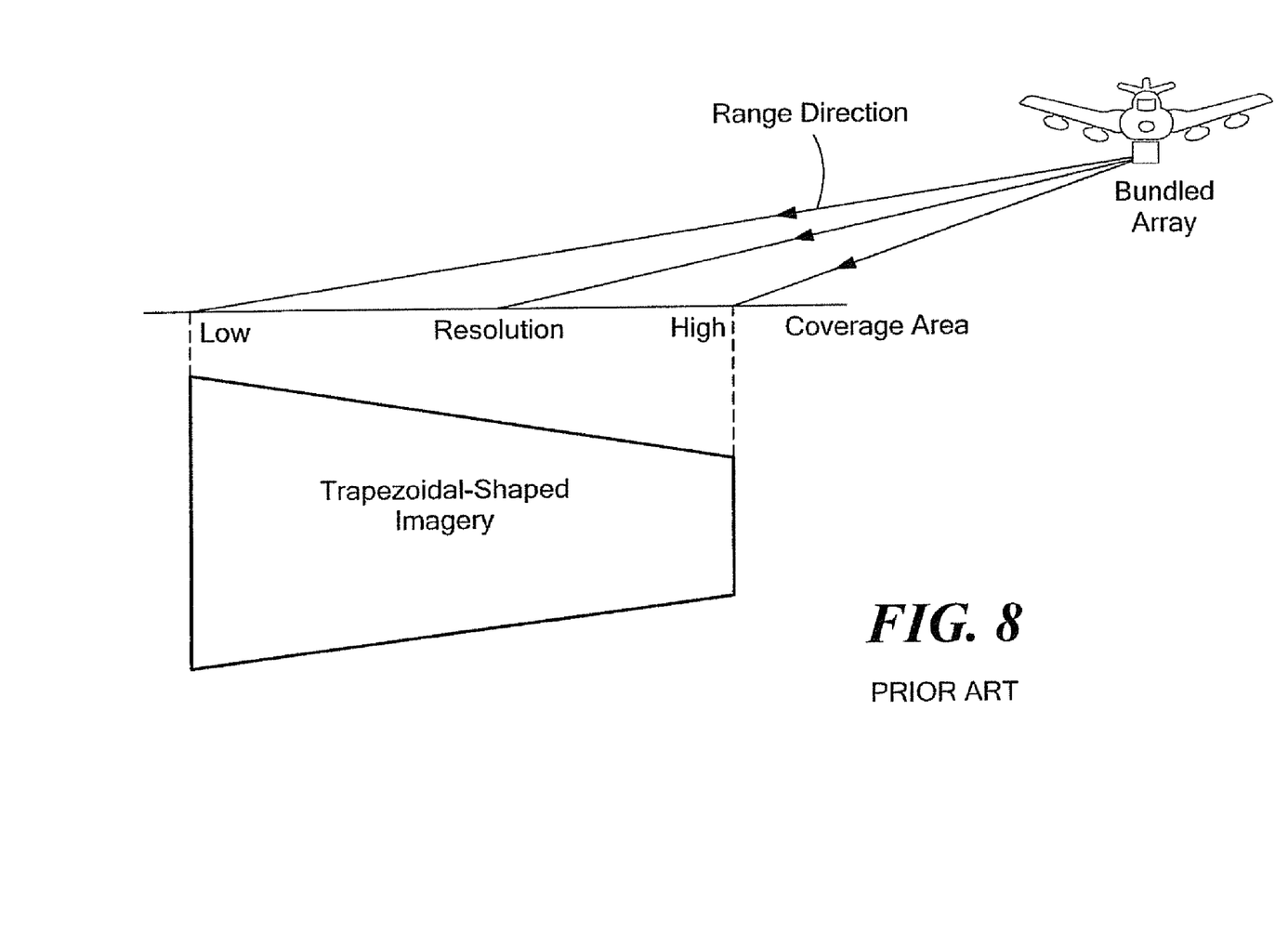
FIG. 8 is a pictorial representation of an operation of a bundled camera array generating range-variant trapezoidal-shaped imagery of an oblique coverage area.

Referring now to FIG. 8, conventional bundled camera arrays which capture imagery at oblique angles relative to the coverage area tend to produce trapezoidal-shaped images with degrading resolution as range increases. Such images may be digitally warped and when patched together with other images, the resultant image can propagate geospatial errors in a spatially-variant and non-linear fashion. Conventional bundled arrays may use special optics and anamorphic projectors (i.e., special projectors designed to modify images) to attempt to reduce and/or eliminate distortions. However, such hardware can be quite expensive. Systems may also process the distorted images; however, these techniques can be quite compute-intensive and time-consuming, which can forgo their application in real-time environments.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An imaging system, comprising:
a focal array comprising:
    a plurality of photosensitive elements disposed at different focal lengths from at least one lens to output an image simulating an orthogonal view of an oblique coverage area; and
    a processor to range-normalize a resolution of a plurality of image regions representing at least a portion of the oblique coverage area.

2. An imaging system, comprising:
a focal array comprising:
    a plurality of photosensitive elements disposed at different focal lengths from at least one lens to output an image simulating an orthogonal view of an oblique coverage area, the plurality of photosensitive elements comprising:
        at least one first photosensitive element arranged in a first layer and positioned at a distance from a first lens substantially equal to the focal length of the first lens, and:
        at least one second photosensitive element arranged in a second layer and positioned at a distance from a second lens substantially equal to the focal length of the second lens,
    wherein the focal length of the first lens is longer than the focal length of the second lens and the first layer and the second layer are offset from each other in a direction substantially parallel to the focal length of at least one of the first lens or the second lens.

3. The imaging system of claim 2, wherein the plane of the first layer is substantially parallel to the plane of the second layer, further comprising:
    a light-absorbing face coupled at one side to the first layer and at another side laterally opposing the one side to the second layer.

4. The imaging system of claim 3, wherein the plane of the light-absorbing face is orthogonal to at least one of the plane of the first layer and the plane of the second layer.

5. The imaging system of claim 2, wherein the focal array is configured to rotate with respect to the oblique coverage area.

6. The imaging system of claim 5, wherein the focal array is configured to substantially align a field-of-view of the focal array with the geographic center of the oblique coverage area.

7. The imaging system of claim 5, wherein the focal array is configured to substantially align a field-of-view of the focal array with an object of interest situated within the oblique coverage area.

8. The imaging system of claim 2, wherein the focal array is an anamorphic focal array, further comprising:
    a processor to range-normalize a resolution of a plurality of image regions representing at least a portion of the oblique coverage area.

9. The imaging system of claim 2, wherein at least one of the photosensitive elements is a charge-coupled device.

10. The imaging system of claim 2, wherein the simulated orthogonal view represents a rectangular projection of the oblique coverage area and the image comprises a plurality of resolution-normalized image regions.

11. The imaging system of claim 2, wherein the focal array is configured to image the oblique coverage area from a surveillance area laterally opposed to the oblique coverage area.

12. The imaging system of claim 2, further comprising:
    a first rotating member coupled to the focal array and configured to rotate the focal array about a first axis of rotation substantially parallel to the plane of the ground to modify an angle of obliqueness of the focal array with respect to the oblique coverage area.

13. The imaging system of claim 12, further comprising:
    a second rotating member coupled to the focal array and configured to rotate a light conducting body independently from the focal array about a second axis of rotation orthogonal to the first axis of rotation to conduct light toward the focal array.

14. An imaging method, comprising:
providing a focal array comprising:
    a plurality of photosensitive elements disposed at different focal lengths from at least one lens to output an image simulating an orthogonal view of an oblique coverage area, the plurality of photosensitive elements comprising:
        at least one first photosensitive element arranged in a first layer and positioned at a distance from a first lens substantially equal to the focal length of the first lens, and
        at least one second photosensitive element arranged in a second layer and positioned at a distance from a second lens substantially equal to the focal length of the second lens,
    wherein the focal length of the first lens is longer than the focal length of the second lens and the first layer and the second layer are offset from each other in a direction substantially parallel to the focal length of at least one of the first lens or the second lens.

15. The method of claim 14, wherein the plane of the first layer is substantially parallel to the plane of the second layer, the focal array further comprises:
    a light-absorbing face coupled at one side to the first layer and at another side laterally opposing the one side to the second layer.

16. The method of claim 15, wherein the plane of the light-absorbing face is orthogonal to at least one of the plane of the first layer and the plane of the second layer.

17. The method of claim 14, wherein the focal array is configured to rotate with respect to the oblique coverage area.

18. The method of claim 17, further comprising aligning a field-of-view of the focal array with the geographic center of the oblique coverage area.

19. The method of claim 17, further comprising:
aligning a field-of-view of the focal array with an object of interest situated within the oblique coverage area.

20. The method of claim 14, further comprising:
processing the image to range-normalize a resolution of a plurality of image regions representing at least a portion of the oblique coverage area.

21. The method of claim 14, wherein at least one of the photosensitive elements is a charge-coupled device.

22. The method of claim 14, wherein the simulated orthogonal view represents a rectangular projection of the oblique coverage area and the image comprises a plurality of resolution-normalized image regions.

23. The method of claim 14, further comprising:
imaging the oblique coverage area from a surveillance area laterally opposed to the oblique coverage area.

24. The method of claim 23, wherein imaging further comprises:
imaging the oblique coverage area from a plurality of vantage points situated within the laterally opposed surveillance area.

25. The method of claim 14, further comprising:
providing a first rotating member coupled to the focal array and configured to rotate the focal array about a first axis of rotation substantially parallel to the plane of the ground to modify an angle of obliqueness of the focal array with respect to the oblique coverage area.

26. The method of claim 25, further comprising:
providing a second rotating member coupled to the focal array and configured to rotate a light conducting body independently from the focal array about a second axis of rotation orthogonal to the first axis of rotation to conduct light toward the focal array.

* * * * *